US012426643B2

(12) United States Patent
Lee

(10) Patent No.: US 12,426,643 B2
(45) Date of Patent: Sep. 30, 2025

(54) AEROSOL GENERATION DEVICE AND OPERATION METHOD THEREFOR

(71) Applicant: KT&G CORPORATION, Daejeon (KR)

(72) Inventor: Seung Won Lee, Gwangmyeong-si (KR)

(73) Assignee: KT&G CORPORATION, Daejeon (KR)

( * ) Notice: Subject to any disclaimer, the term of this patent is extended or adjusted under 35 U.S.C. 154(b) by 1241 days.

(21) Appl. No.: 17/040,665

(22) PCT Filed: Oct. 31, 2019

(86) PCT No.: PCT/KR2019/014564
§ 371 (c)(1),
(2) Date: Sep. 23, 2020

(87) PCT Pub. No.: WO2020/122414
PCT Pub. Date: Jun. 18, 2020

(65) Prior Publication Data

US 2021/0015166 A1 Jan. 21, 2021

(30) Foreign Application Priority Data

Dec. 14, 2018 (KR) ........................ 10-2018-0162141

(51) Int. Cl.
*A24F 40/57* (2020.01)
*H05B 6/06* (2006.01)

(52) U.S. Cl.
CPC ............... *A24F 40/57* (2020.01); *H05B 6/06* (2013.01)

(58) Field of Classification Search
CPC .......... A24F 40/57; A24F 40/50; A24F 40/00; H05B 6/06
USPC ........................................ 392/386, 394, 396
See application file for complete search history.

(56) References Cited

U.S. PATENT DOCUMENTS

| | | | | |
|---|---|---|---|---|
| 10,143,232 | B2 | 12/2018 | Talon | |
| 10,477,900 | B2 | 11/2019 | Hopps | |
| 10,667,559 | B2 | 6/2020 | Bessant et al. | |
| 2014/0060552 | A1 | 3/2014 | Cohen | |
| 2015/0237917 | A1 | 8/2015 | Lord | |
| 2016/0331038 | A1 | 11/2016 | Farine et al. | |
| 2016/0374401 | A1* | 12/2016 | Liu | A24F 40/50 131/328 |
| 2017/0013879 | A1 | 1/2017 | Frisbee et al. | |

(Continued)

FOREIGN PATENT DOCUMENTS

| | | | |
|---|---|---|---|
| CA | 2 923 374 | A1 | 6/2015 |
| CN | 103876288 | A | 6/2014 |

(Continued)

OTHER PUBLICATIONS

Extended European Search Report dated Nov. 11, 2021, issued by the European Patent Office in application No. 19895724.3.

(Continued)

*Primary Examiner* — Steven W Crabb
*Assistant Examiner* — Alba T Rosario-Aponte
(74) *Attorney, Agent, or Firm* — Sughrue Mion, PLLC

(57) ABSTRACT

An aerosol-generating device according to an embodiment includes: a heater including a heating element for heating an aerosol-generating material; and a controller including a first port electrically connected to the heater, and configured to control operation of the heating element by controlling activation of the first port.

11 Claims, 8 Drawing Sheets

(56) References Cited

U.S. PATENT DOCUMENTS

| | | | | |
|---|---|---|---|---|
| 2017/0303595 | A1 | 10/2017 | Bernauer et al. | |
| 2017/0347704 | A1 | 12/2017 | Oishi | |
| 2018/0027878 | A1 * | 2/2018 | Dendy | H05B 1/0244 |
| 2018/0150121 | A1 * | 5/2018 | Basterash | H02J 7/0042 |
| 2019/0216136 | A1 | 7/2019 | Capuano | |
| 2021/0298364 | A1 | 9/2021 | Yu et al. | |

FOREIGN PATENT DOCUMENTS

| | | | | |
|---|---|---|---|---|
| CN | 103974638 | A | | 8/2014 |
| CN | 106579563 | A | | 4/2017 |
| CN | 206197035 | U | | 5/2017 |
| CN | 207653575 | U | | 7/2018 |
| CN | 108652089 | A | | 10/2018 |
| JP | 2018526983 | A | * | 9/2018 |
| KR | 10-2014-0063506 | A | | 5/2014 |
| KR | 10-2014-0090138 | A | | 7/2014 |
| KR | 10-1619034 | B1 | | 5/2016 |
| KR | 10-2017-0066337 | A | | 6/2017 |
| KR | 20170066337 | A | * | 6/2017 |
| KR | 10-2017-0106454 | A | | 9/2017 |
| KR | 10-2017-0118238 | A | | 10/2017 |
| TW | 201818834 | A | | 6/2018 |
| WO | 2013/152873 | A1 | | 10/2013 |

OTHER PUBLICATIONS

Communication dated Sep. 14, 2021, issued by the Japanese Patent Office in application No. 2020-544201.

Office Action issued Nov. 28, 2022 in Chinese Application No. 201980017681.3.

Office Action issued from Korean Patent Application No. 10-2018-0162141 issued on Jun. 19, 2020.

International Search Report for PCT/KR2019/014564 dated Feb. 12, 2020 (PCT/ISA/210).

* cited by examiner

AEROSOL GENERATION DEVICE AND OPERATION METHOD THEREFOR

CROSS REFERENCE TO RELATED APPLICATIONS

This application is a National Stage of International Application No. PCT/KR2019/014564 filed Oct. 31, 2019, claiming priority based on Korean Patent Application No. 10-2018-0162141 filed Dec. 14, 2018.

TECHNICAL FIELD

The invention disclosed by the present application relates to an aerosol-generating device and a method of operation of the same.

BACKGROUND ART

Recently, the demand for alternative methods to overcome the shortcomings of general cigarettes has increased. For example, there is growing demand for a method of generating aerosol by heating an aerosol-generating material in cigarettes, rather than by combusting cigarettes. Accordingly, studies on a heating-type cigarette and a heating-type aerosol generating device have been actively conducted.

In general, a large amount of power is required to heat an aerosol-generating material. However, an aerosol-generating device has a limited power supply as a small portable device. Therefore, it is very important to efficiently manage the power of a battery of an aerosol-generating device.

DESCRIPTION OF EMBODIMENTS

Technical Problem

The problem to be solved by the present invention is to provide an aerosol-generating device for controlling activation of a port connected to a heater and a method of operating the same.

The problem to be solved by the present invention is not limited to the above-described problem, and the problems not mentioned will be clearly understood by those skilled in the art from the present specification and the accompanying drawings.

Solution to Problem

According to an embodiment, an aerosol-generating device includes: a heater including a heating element for heating an aerosol-generating material; and a controller including a first port electrically connected to the heater, and configured to control operation of the heating element by controlling activation of the first port.

In addition, the heater may include a switch connected to the heating element, and the controller deactivates the first port to cut off power supplied to the switch.

In addition, the heater includes a switch connected to the heating element, and the controller activates the first port to supply power to the switch.

In addition, the aerosol-generating device may further include a user interface for receiving a user input, and the controller may include a second port electrically connected to the user interface, and activate the first port based on a user input received through the second port In addition, the controller may switch from a first mode in which the first port is deactivated to a second mode to activate the first port when the user input is received through the second port in a first mode.

In addition, the aerosol-generating device may further include a sensor for checking a state of the heating element, and the controller may further include a third port electrically connected to the sensor, and periodically activate and deactivate the third port.

In addition, the controller activates the third port for a first time period and deactivates the third port for a second time period.

In addition, the controller activates the first port whenever the third port is activated.

In addition, the controller outputs an alarm signal when the temperature of the heating element measured through the sensor is greater than or equal to a predetermined temperature.

In addition, the aerosol-generating device may further include a sensor for checking a state of the heating element, and the controller further includes a third port electrically connected to the sensor and periodically switches between a first mode in which the first port is deactivated and in a third mode in which the third port is activated.

According to another embodiment, a method of operation of an aerosol-generating device may include: determining whether to activate a first port of a controller electrically connected to a heater including a heating element for heating an aerosol-generating material; and controlling operation of the heating element based on activation of the first port.

In addition, the method of operation of an aerosol-generating device may further include deactivating the first port in a first mode; receiving a user input through a second port of the controller electrically connected to a user interface in the first mode; and activating the first port by entering a second mode.

In addition, the method of operation of an aerosol-generating device may further include periodically switching between a third mode for deactivating a third port and a fourth mode for activating the third port every predetermined time.

According to another embodiment, a program for executing the above-described method of operating the aerosol-generating device on a computer may be recorded on a computer-readable recording medium.

Advantageous Effects of Disclosure

According to an embodiment, a port connected to the heater is blocked when the aerosol-generating material is not being heated. As such, the standby current consumed through the port may be reduced, and the battery life may be increased.

The effects of the present invention are not limited to the above-mentioned effects, and the effects not mentioned will be clearly understood by those skilled in the art from the present specification and the accompanying drawings.

BEST MODE

According to an embodiment, an aerosol-generating device includes: a heater including a heating element for heating an aerosol-generating material; and a controller including a first port electrically connected to the heater, and configured to control operation of the heating element by controlling activation of the first port.

According to another embodiment, a method of operation of an aerosol-generating device includes: determining whether to activate a first port of a controller electrically connected to a heater including a heating element for heating an aerosol-generating material; and controlling operation of the heating element based on whether the first port is activated.

According to another embodiment, a program for executing the above-described method of operating the aerosol-generating device on a computer may be recorded on a computer-readable recording medium.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Figure 1:
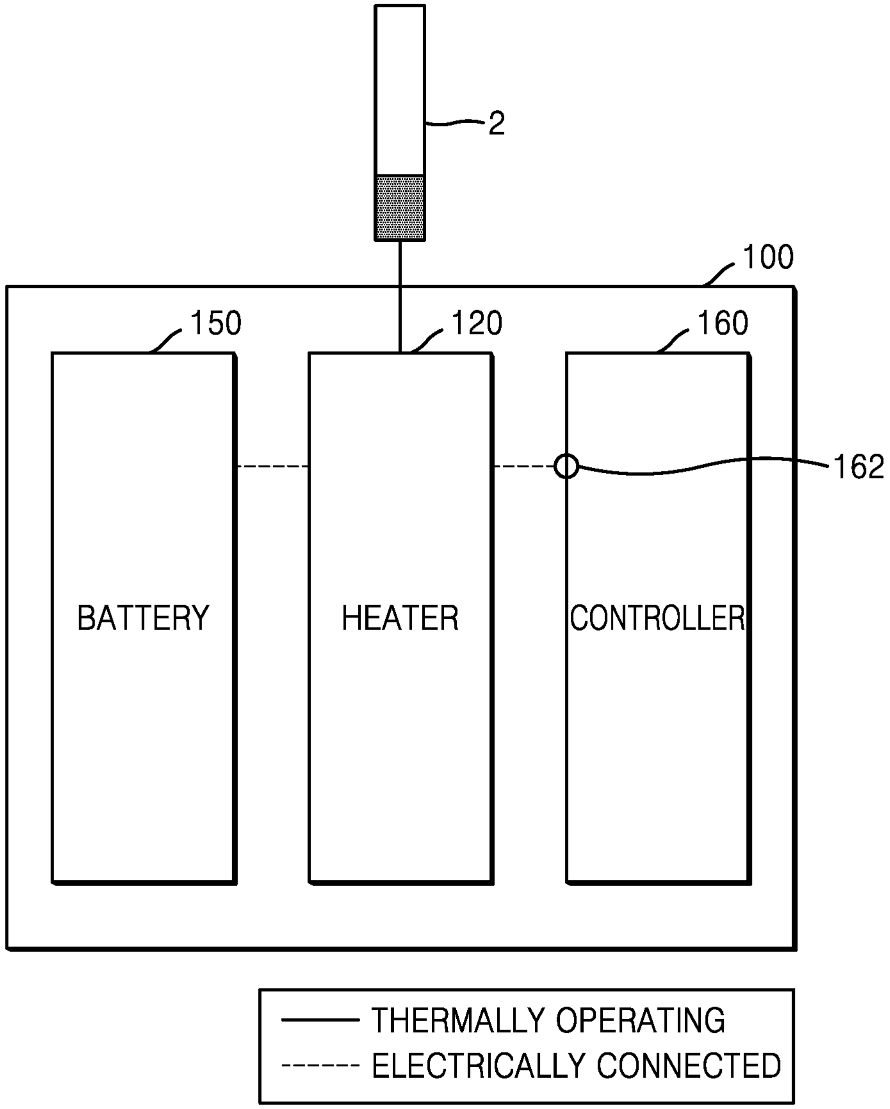
FIGS. 1 and 2 are block diagrams showing examples of an aerosol-generating device.
Figure 2:
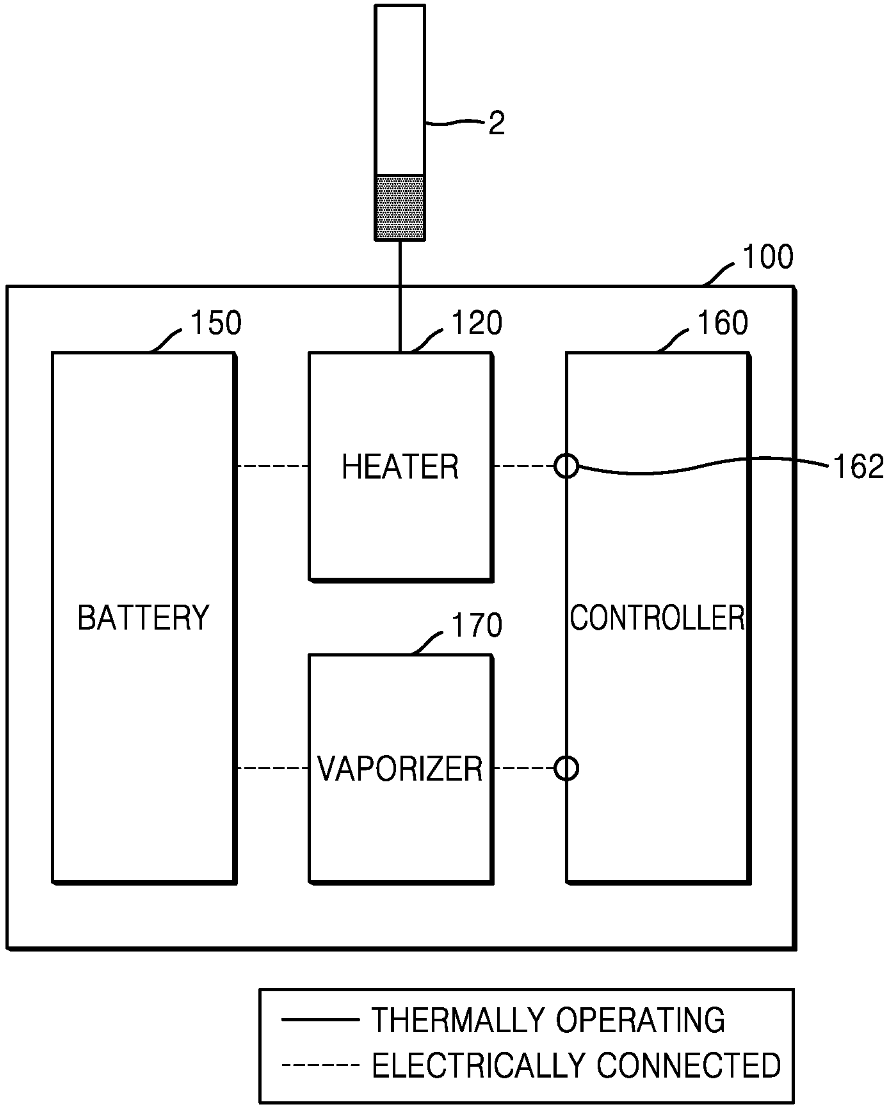

FIGS. 1 and 2 are block diagrams showing examples of an aerosol-generating device.

Referring to FIG. 1, the aerosol-generating device 100 may include a heater 120, a battery 150, and a controller 160. Referring to FIG. 2, the aerosol-generating device 100 may further include a vaporizer 170. In addition, an aerosol-generating material may be inserted into an inner space of the aerosol-generating device 100. For example, a cigarette 2 containing the aerosol-generating material may be inserted into the aerosol-generating device 100.

FIGS. 1 and 2 only illustrate certain components of the aerosol generating device 100, which are particularly related to the present embodiment. Therefore, it will be understood by one of ordinary skill in the art related to the present embodiment that other general-purpose components may be further included in the aerosol generating device 100, in addition to the components illustrated in FIGS. 1 and 2.

The internal structure of the aerosol-generating device 100 is not limited to that shown in FIGS. 1 to 2. In other words, according to a design of the aerosol-generating device 100, an arrangement of the battery 150, the controller 160, the heater 120, and the vaporizer 170 may be changed.

When the cigarette 2 is inserted into the aerosol generating device 100, the aerosol generating device 100 may operate the heater 120 and/or the vaporizer 170 to generate an aerosol. The aerosol generated by the heater 120 and/or the vaporizer 170 is delivered to a user by passing through the cigarette 2.

As necessary, even when the cigarette 2 is not inserted into the aerosol generating device 100, the aerosol generating device 100 may heat the heater 120.

The battery 150 may supply power to be used for the aerosol generating device 100 to operate. For example, the battery 150 may supply power to heat the heater 120 or the vaporizer 170, and may supply power for operating the controller 160. Also, the battery 150 may supply power for operations of a display, a sensor, a motor, etc. installed in the aerosol generating device 100.

The controller 160 may control overall operations of the aerosol generating device 100. In detail, the controller 160 may control not only operations of the battery 150, the heater 120, and the vaporizer 170, but also operations of other components included in the aerosol generating device 100. Also, the controller 160 may check a state of each of the components of the aerosol generating device 100 to determine whether or not the aerosol generating device 100 is able to operate.

The controller 160 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 160 may include at least one port through which other components may communicate. For example, the controller 160 may control the heater 120 by communicating with the heater 120 through the heater connection port 162.

The port is a passage through which an electrical signal may pass, and may be, for example, a pin located outside a processor.

The controller 160 may determine whether to activate the port. The controller 160 may activate the port and transmit an electrical signal to other electrical devices connected to the port. Alternatively, the controller 160 may deactivate the port to block an electrical signal transmitted to other electrical devices connected to the port.

The controller 160 may operate in multiple modes. The modes may include a mode for standby in a low power state, a mode for heating the heating element 122, and a mode for checking the state of the heating element 122. An algorithm or program for performing a specific function may be executed in each mode.

In each mode, the controller 160 may activate the ports differently.

The ports included in the controller 160 will be described in detail later with reference to FIGS. 4 and 7.

The heater 120 may be heated by the power supplied from the battery 150. For example, when the cigarette 2 is inserted into the aerosol generating device 100, the heater 120 may be located outside the cigarette 2. Thereby, the heated heater 120 may increase a temperature of an aerosol generating material in the cigarette 2. The heater 120 may include a heating element 122 that is heated to increase a temperature of the heater 120.

The heater 120 may be an electric resistive heater. For example, the heater 120 includes an electrically conductive track as the heating element 122, and the heating element 122 may be heated as current flows through the electrically conductive track. However, the heater 120 is not limited to the example described above and may include any other heaters which may be heated to a desired temperature. Here, the desired temperature may be pre-set in the aerosol generating device 100 or may be set by a user.

As another example, the heater 120 may be an induction-heating heater. In detail, the heater 120, the heater 120 may include an electrically conductive coil as a heating element 122 which heats for induction heating the cigarette 2 by induction heating. In this case, the cigarette 2 may include a susceptor that may be heated by an induction heater.

For example, the heating element 122 of the heater 120 may include a tubular heating element 122, a plate-shaped heating element 122, a needle-shaped heating element 122, or a rod-shaped heating element 122. The internal or external of the cigarette 2 may be heated in many ways, depending on the shape of the heating element 122.

In addition, the heater 120 may include a plurality of heating elements 122. Here, the plurality of heating elements 122 may be arranged such that they are inserted into the inside of the cigarette 2 or disposed outside the cigarette 2. In addition, the shape of the heating element 122 may be manufactured in various forms.

The vaporizer 170 may generate an aerosol by heating a liquid composition and the generated aerosol may pass through the cigarette 2 to be delivered to a user. In other words, the aerosol generated by the vaporizer 170 may move along an air flow passage of the aerosol generating device 100, and the air flow passage may be formed such that the aerosol generated by the vaporizer 170 passes through the cigarette 2 to be delivered to the user.

For example, the vaporizer 170 may include a liquid storage, a liquid delivery element, and a heating element 122, but it is not limited thereto. For example, the liquid storage, the liquid delivery element, and the heating element 122 may be included in the aerosol generating device 100 as independent modules.

The liquid storage may store a liquid composition. For example, the liquid composition may be a liquid including a tobacco-containing material having a volatile tobacco flavor component. Alternatively, the liquid composition may be a liquid including may be a liquid including a non-tobacco material. The liquid storage may be formed to be attached to and detached from the vaporizer 14000. Alternatively, the liquid storage may be formed integrally with the vaporizer 14000 as a single body.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element 122. For example, the liquid delivery element may be a wick such as cotton fiber, ceramic fiber, glass fiber, or porous ceramic, but is not limited thereto.

The heating element 122 is an element for heating the liquid composition delivered by the liquid delivery element. For example, the heating element 122 may be a metal heating wire, a metal hot plate, a ceramic heater, or the like, but is not limited thereto. In addition, the heating element 122 may include a conductive filament such as nichrome wire and may be positioned as being wound around the liquid delivery element. The heating element 122 may be heated by a current supply and may transfer heat to the liquid composition in contact with the heating element 122, thereby heating the liquid composition. As a result, aerosol may be generated.

For example, the vaporizer 170 may be referred to as a cartomizer or an atomizer, but it is not limited thereto.

The aerosol generating device 100 may further include general-purpose components in addition to the battery 150, the controller 160, the heater 120, and the vaporizer 170. For example, the aerosol generating device 100 may include a display capable of outputting visual information and/or a motor for outputting haptic information. Also, the aerosol generating device 100 may include at least one sensor 130 (a puff detecting sensor, a temperature detecting sensor, a cigarette insertion detecting sensor, etc.). Also, the aerosol generating device 100 may be formed as a structure where, even when the cigarette 2 is inserted into the aerosol generating device 100, external air may be introduced or internal air may be discharged.

Although not illustrated in FIGS. 1 and 2, the aerosol generating device 100 and an additional cradle may form together a system. For example, the cradle may be used to charge the battery 150 of the aerosol generating device 100. The heater 120 may be heated when the cradle and the aerosol generating device 100 are coupled to each other.

The cigarette 2 may be similar to a general combustive cigarette. For example, the cigarette 2 may be divided into a first portion including an aerosol generating material and a second portion including a filter, etc. In an embodiment, the second portion of the cigarette 2 may also include an aerosol generating material. For example, an aerosol-generating material in the form of granules or capsules may be included in the second portion.

The first portion may be fully inserted into the aerosol generating device 100, and the second portion may be exposed to the outside. Alternatively, only a portion of the first portion may be inserted into the aerosol generating device 100. As another example, the entire first portion and a portion of the second portion may be inserted into the aerosol generating device 100. The user may puff aerosol while holding the second portion by the mouth of the user. In this case, the aerosol is generated by the external air passing through the first portion. The generated aerosol passes through the second portion and is delivered to the user's mouth.

For example, the external air may flow into at least one air passage formed in the aerosol generating device 100. For example, the opening and closing of the air passage and/or a size of the air passage may be adjusted by the user. Accordingly, the amount and quality of the aerosol may be adjusted by the user. As another example, the external air may flow into the cigarette 2 through at least one hole formed in a surface of the cigarette 2.

Figure 3:
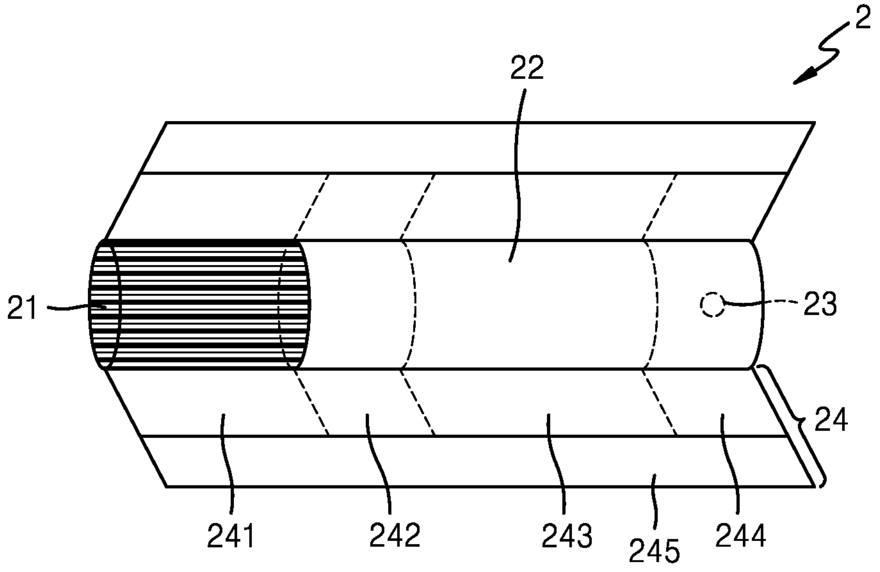
FIG. 3 is a drawing illustrating an example of a cigarette.

FIG. 3 is a drawing illustrating an example of a cigarette.

Referring to FIG. 3, the cigarette 2 may include a tobacco rod 21 and a filter rod 22. The first portion 21 described above with reference to FIGS. 1 and 2 may include the tobacco rod 21, and the second portion may include the filter rod 22.

The filter rod 22 includes a single segment or a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2 may be packaged by at least one wrapper 24. The wrapper 24 may have at least one hole through which external air may be introduced or internal air may be discharged. For example, the cigarette 2 may be packaged by one wrapper 24. As another example, the cigarette 2 may be doubly packaged by at least two wrappers 24. For example, the tobacco rod 21 may be packaged by a first wrapper, and the filter rod 22 may be packaged by wrappers 242, 243, 244. Also, the entire cigarette 2 may be packaged by a single wrapper 245. When each of the filter rod 22 includes a plurality of segments, each segment may be packaged by the wrappers 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Although not shown, the cigarette 2 may further include a front end plug. The front end plug may be located on one side of the tobacco rod 21 opposite the filter rod 22. The front end plug may prevent the cigarette rod 21 from being detached, and may prevent a liquefied aerosol from flowing into the aerosol-generating device 100 from the cigarette rod 21 during smoking.

Figure 4:
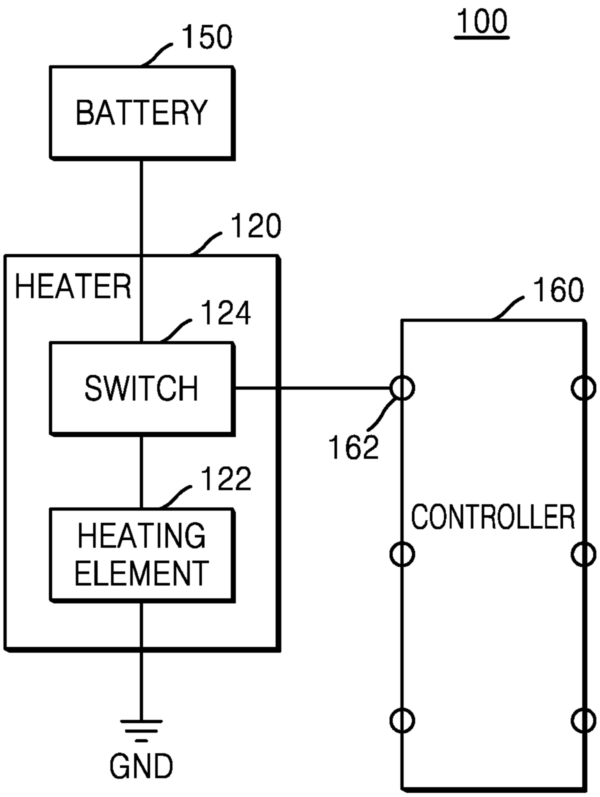
FIG. 4 is a diagram schematically illustrating a circuit of the aerosol-generating device of FIG. 1.

FIG. 4 is a diagram schematically illustrating a circuit of the aerosol-generating device of FIG. 1. Referring to FIG. 4, the heater 120 may include a heating element 122 and a switch 124 connected to the heating element 122.

The switch 124 may connect or disconnect the heating element 122 with the battery 150. In addition, the switch 124 may be connected to the controller 160 through the heater connection port 162.

The switch 124 may be electrically connected in series with the heating element 122. For example, the switch 124 may be located between the heating element 122 and the battery 150 as shown in FIG. 4. Unlike FIG. 4, the heater 120 may include a plurality of switches.

The switch 124 may be opened or closed according to an external input signal received through the heater connection port 162. The heating element 122 may not receive power from the battery 150 when the switch 124 is opened, and may receive power from the battery 150 when the switch 124 is closed.

For example, the switch 124 may be a field effect transistor (FET). The switch 124 may be located such that a source of the FET is connected to the battery 150, a drain is connected to the heating element 122, and a gate is connected to the controller 160.

The state of the switch 124 may be determined depending on the strength of a signal transmitted to the gate of the switch 124. When a signal equal to or greater than a reference value is applied to the gate, current flows from the source to the drain, thereby closing the switch 124. Conversely, when a signal less than the reference value is applied to the gate, the switch 124 may be opened.

The switch 124 may be a P-channel FET, but is not limited thereto. That is, the switch 124 may be an N-channel FET.

As another example, the switch 124 may be a bipolar junction transistor (BJT), an insulated gate bipolar transistor (IGBT), or a thyristor, but is not limited to thereto.

The controller 160 may transmit an electrical signal to the switch 124 of the heater 120 through the heater connection port 162. The electrical signal is a signal that controls the open/closed state of the switch 124. The controller 160 may control the heating operation of the heating element 122 by controlling opening and closing of the switch 124.

The controller 160 may determine whether to activate the heater connection port.

When the heater connection port 162 is activated, an electrical signal is transmitted from the controller 160 to the switch 124 such that power is supplied. If switch 124 is closed by the electrical signal transmitted to the heater connection port 162, power is supplied from the battery 150 to the heating element 122 so that the heating element 122 may initiate a heating operation.

When the heater connection port 162 is deactivated, the electrical signal or power supplied by the controller 160 to the switch 124 may be cut off. Accordingly, the switch 124 is opened, and the heating operation of the heating element 122 may be stopped.

When the heater connection port 162 is deactivated, an electric signal that enters and exits the heater connection port 162 is blocked, so that unnecessary power consumption is reduced while the heating element 122 is not being heated.

In an embodiment, the controller 160 may control the operation of the heater 120 by controlling the electrical signal transmitted to the switch 124 while the heater connection port 162 is activated. However, in this case, even if the switch 124 is in an open state, an electrical signal having a reference value or less may be transmitted to the switch 124 through the heater connection port 162, which results in consumption of a standby current.

Accordingly, by deactivating the heater connection port 162, the controller 160 may remove the electrical signal that enters and exits the heater connection port 162 while the heating element 122 is not being heated, thereby reducing a standby current.

The controller 160 may include an internal switch for controlling activation of the heater connection port 162. For example, the controller 160 may include a switch installed on a circuit connecting an internal processor with the heater connection port 162. The controller 160 may close the switch to activate the heater connection port 162 or open the switch to deactivate the heater connection port 162.

Figure 5:
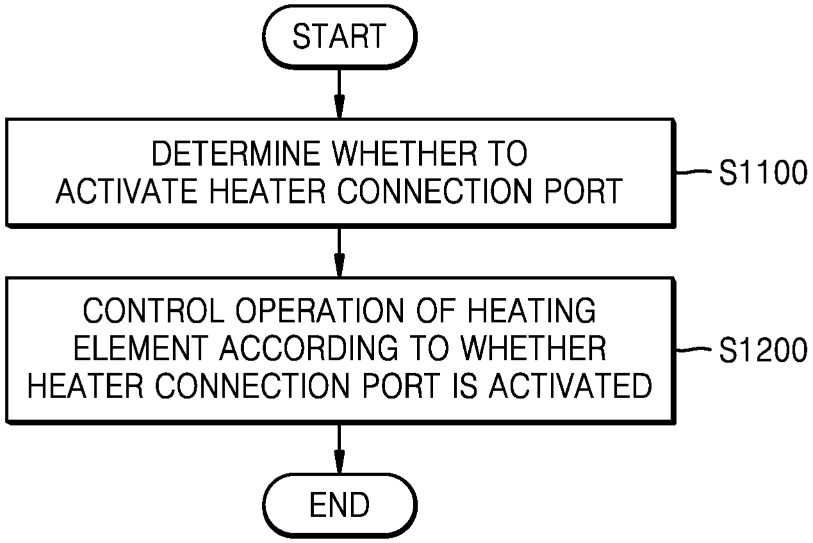
FIG. 5 is a diagram illustrating a method of control of a connection port of a heater by an aerosol-generating device.

FIG. 5 is a diagram illustrating a method of control of a connection port of a heater by an aerosol-generating device.

Referring to FIG. 5, in step S1100, the aerosol-generating device 100 may determine whether to activate the heater connection port 162.

The controller 160 may activate the heater connection port 162 in various cases where heating of an aerosol-generating material is required.

For example, when a user input for smoking is received, the controller 160 may activate the heater connection port 162.

Alternatively, when the cigarette 2 is inserted into the aerosol-generating device 100, the controller 160 may activate the heater connection port 162 for preheating the heating element 122.

Alternatively, when the temperature of the heating element 122 falls to a preset temperature or lower, in order to respond to the smoking behavior, the controller 160 may activate the heater connection port 162.

Alternatively, in order to maintain the temperature of the heating element 122 to a predetermined temperature or higher for rapid smoking, when the temperature of the heating element 122 falls below a predetermined temperature, the controller 160 may activate the heater connection port 162.

The controller 160 may deactivate the heater connection port 162 in various cases where heating of the aerosol-generating material is not required.

For example, the controller 160 may deactivate the heater connection port 162 when no user input is received for a predetermined time.

Alternatively, the controller 160 may deactivate the heater connection port 162 when the power of the battery 150 falls to a predetermined value or lower and power conservation is required.

Alternatively, when the battery 150 is being charged, the controller 160 may deactivate the heater connection port 162.

Alternatively, the controller 160 may deactivate the heater connection port 162 when the number of continuously detected puffs exceeds a predetermined number.

Alternatively, if the temperature of the heating element 122 is greater than or equal to a predetermined temperature, the controller 160 may deactivate the heater connection port 162 for safety.

In step S1200, the aerosol-generating device 100 may control the operation of the heating element 122 according to whether the heater connection port 162 is activated.

When the controller 160 activates the heater connection port 162 and supplies power to the switch 124, the power-supplied switch 124 may be closed to electrically connect the battery 150 with the heating element 122. Thereby, the heating element 122 may perform a heating operation to heat the aerosol-generating material.

When the controller 160 deactivates the heater connection port 162 and cuts off power to and from the heater connection port 162, the switch 124 is opened. Accordingly, the battery 150 and the heating element 122 may be electrically disconnected, and the heating operation of the heating element 122 may be stopped.

Therefore, if the heater connection port 162 is deactivated, heating of the heater 120 may be stopped. At this time, the electrical signal through the heater connection port 162 is blocked, and the standby power of the aerosol-generating device 100 may be reduced.

Figure 6:
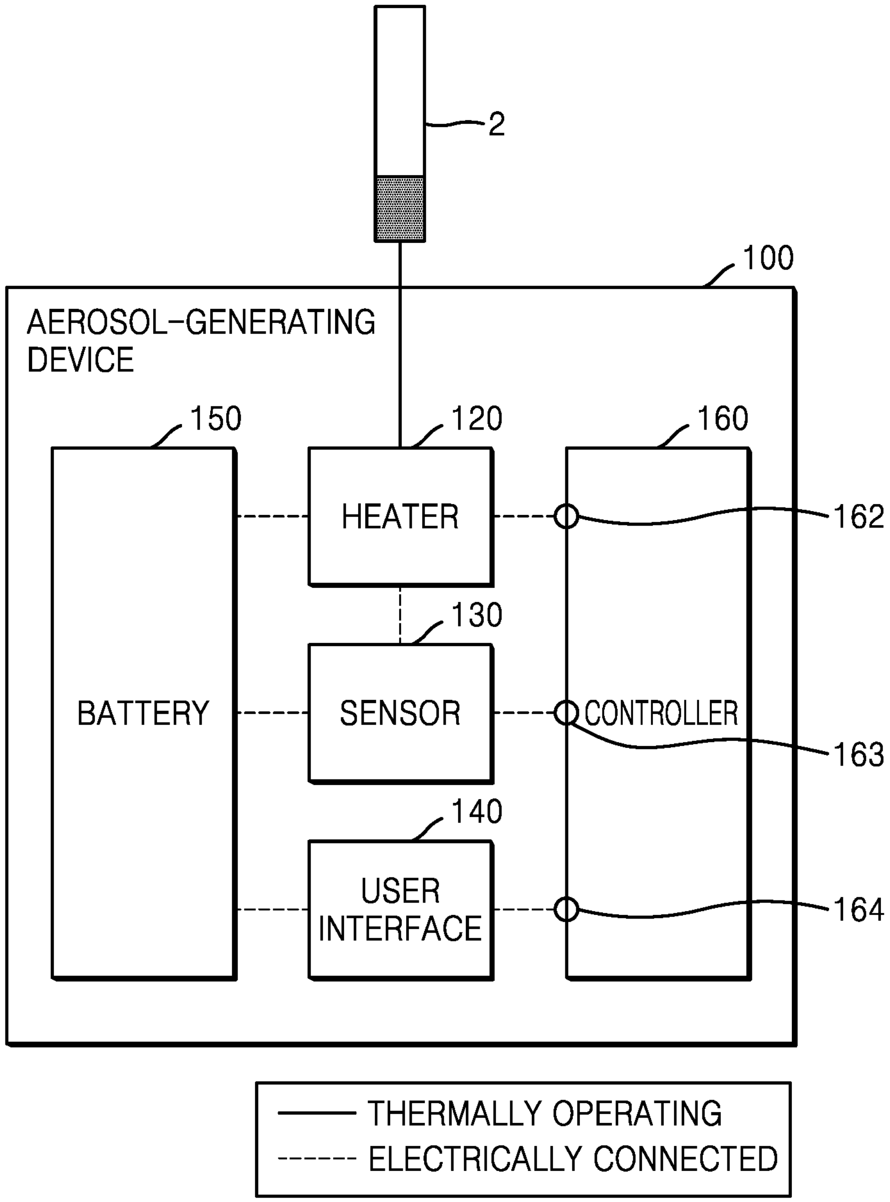
FIG. 6 is a block diagram showing another example of an aerosol-generating device.
Figure 7:
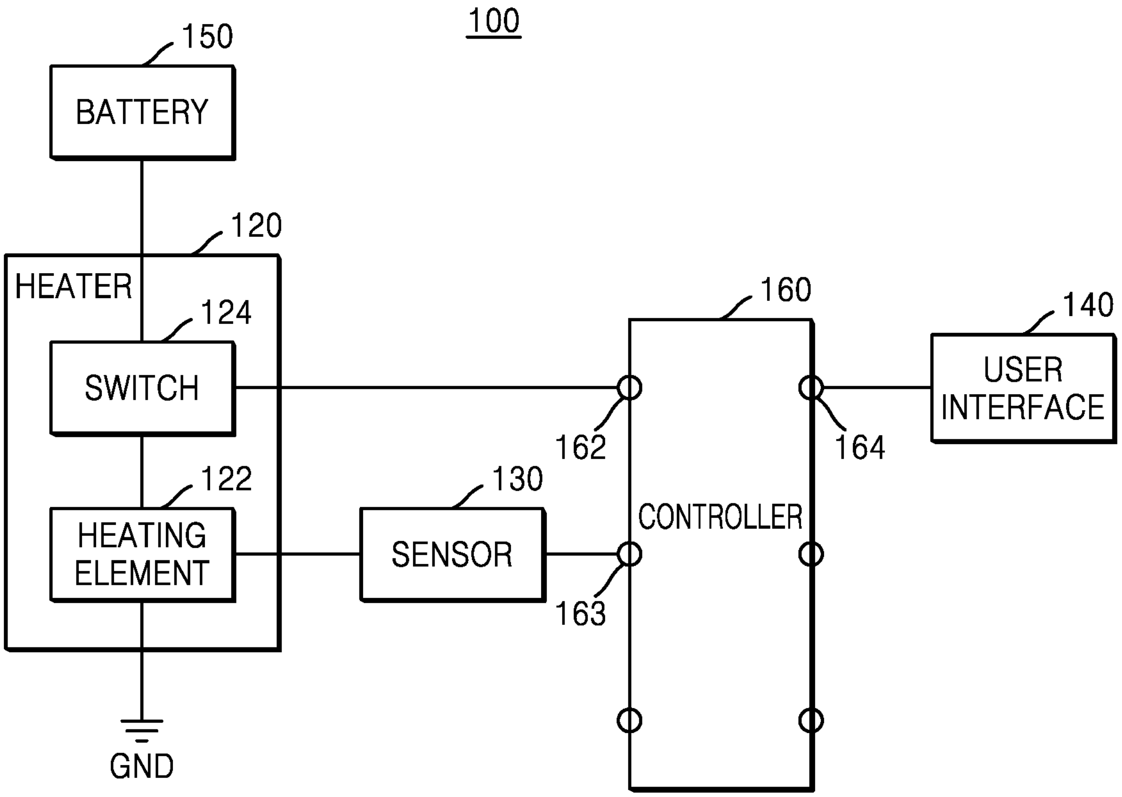
FIG. 7 is a diagram schematically illustrating a circuit of the aerosol-generating device of FIG. 6.

FIG. 6 is a block diagram showing another example of an aerosol-generating device, and FIG. 7 is a diagram schematically illustrating a circuit of the aerosol-generating device of FIG. 6.

Referring to FIGS. 6 and 7, the aerosol-generating device 100 may further include a user interface 140 and a sensor 130.

The aerosol-generating device 100 may not necessarily include both the user interface 140 and the sensor 130. For example, the aerosol-generating device 100 may include only one of the user interface 140 and the sensor 130.

The user interface 140 may receive a user input from a user.

For example, the user interface 140 may be various types of input devices such as buttons, switches, touch pads, pressure sensors, etc.

The user input may have a variety of purposes. Various user inputs may be received through the interface 140. The various user inputs include, for example, a user input for heating of the heating element 122, a user input for stopping heating of the heating element 122, an input for preheating of the heating element 122, an input for adjusting the heating intensity, and an input for turning on/off the aerosol-generating device 100.

The user interface 140 may be multiple, and at least some of the user inputs described above may be received.

The controller 160 may include a user interface connection port 164 that is electrically connected to the user interface 140. The controller 160 may receive information such as whether the user input is received and a type of the received user input through the user interface connection port 164.

The controller 160 may control the operation of the heater 120 according to the user input received through the user interface connection port 164. For example, when a user input for heating is received through the user interface 140, the controller 160 may supply power to the switch 124 to initiate a heating operation of the heating element 122.

Alternatively, when a user input for stopping heating is received through the interface 140, the controller 160 may cut off the power supplied to the switch 124 to stop the heating operation of the heating element 122.

The controller 160 may activate the user interface connection port 164 as necessary. The controller 160 may activate the user interface connection port 164 to receive information related to user input from the user interface 140. Also, the controller 160 may deactivate the user interface connection port 164 to block electrical signals entering and exiting the user interface 140.

The controller 160 may deactivate the user interface connection port 164 to reduce power consumed through the user interface connection port.

The sensor 130 may sense information related to the state of the heating element 122.

The information related to the state of the heating element 122 may include, for example, temperature information of the heating element 122, information about whether the heating element 122 is being heated, and information about the heating strength of the heating element 122, and the like. For example, the sensor 130 may be a temperature sensor. For example, the sensor 130 may be a thermistor using a property that the resistance of a material changes with temperature. Alternatively, the sensor 130 may measure a temperature using thermal expansion of a liquid material. Alternatively, the sensor 130 may measure the temperature using electromagnetic waves emitted according to a surface temperature.

The controller 160 may include a sensor connection port 163 that is electrically connected to the sensor 130.

The sensor 130 may transmit information related to the sensed state of the heating element 122 to the controller 160 through the sensor connection port 163. The controller 160 may determine the state of the heating element 122 by analyzing information related to the state of the heating element 122 received through the sensor connection port 163. In addition, the controller 160 may transmit an electrical signal for controlling the sensor 130 through the sensor connection port 163 to the sensor 130.

The controller 160 may determine whether to activate the sensor connection port 163 as necessary. For example, the controller 160 may reduce a standby power by deactivating the sensor connection port 163 to block an electrical signal that may enter or exit through the sensor connection port 163.

The controller 160 may periodically receive information related to the state of the heating element 122 by periodically activating the sensor connection port 163.

The controller 160 may output a control signal based on the received information related to the state of the heating element 122. For example, when the received temperature value of the heating element 122 is out of a predetermined temperature range or out of a predetermined temperature profile, the controller 160 may output a control signal so that the switch 124 is opened, and output an alarm signal informing the user.

Figure 8:
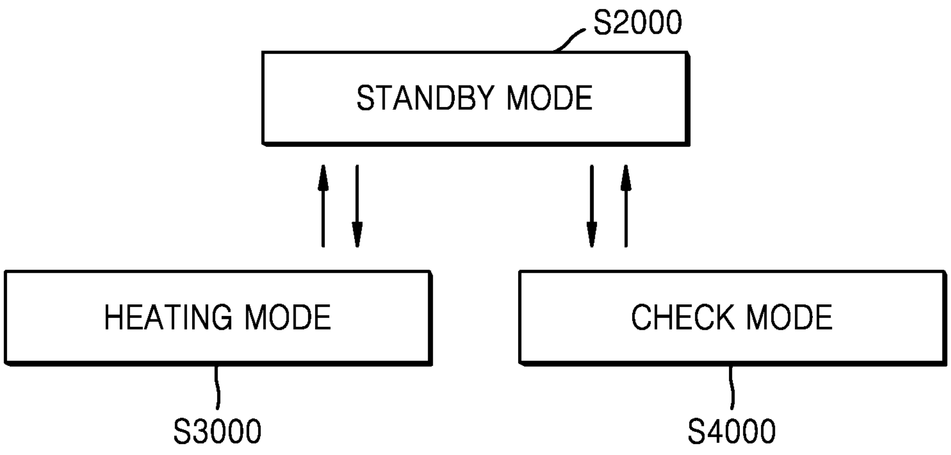
FIG. 8 is a diagram illustrating modes in which the aerosol-generating device of FIG. 7 may operate.

FIG. 8 is a diagram illustrating different modes in which the aerosol-generating device of FIG. 7 may operate.

Referring to FIG. 8, the aerosol-generating device 100 may operate a standby mode S2000, a heating mode S3000, and a check mode S4000.

The aerosol-generating device 100 does not necessarily need to operate in each of the standby mode S2000, the heating mode S3000, and the check mode S4000. According to an embodiment, the aerosol-generating device 100 may only operate in the standby mode S2000 and the heating mode S3000. Alternatively, the aerosol-generating device 100 may only operate a standby mode S2000 and a check mode S4000.

Of course, the standby mode S2000, the heating mode S3000, and the check mode S4000 are only examples of an operating mode of the aerosol-generating device 100, and the operating modes of the aerosol-generating device 100 is not limited thereto.

The ports may be activated differently in each mode.

The standby mode S2000 is a mode for minimizing power consumption.

The aerosol-generating device 100 does not heat the heating element 122 in the standby mode S2000. For example, the controller 160 deactivates the heater connection port 162 in the standby mode S2000. By doing so, the aerosol-generating device 100 may prevent power consumption through the heater connection port 162 in the standby mode.

In addition, the aerosol-generating device 100 does not receive information related to the state of the heating element 122 in the standby mode S2000. The controller 160 deactivates the sensor connection port 163 in the standby mode S2000. By doing so, the aerosol-generating device 100 may prevent power consumption through the sensor connection port 163 in the standby mode.

Moreover, according to an embodiment, the aerosol-generating device 100 may activate the user interface connection port 164 in the standby mode S2000. Accordingly, the aerosol-generating device 100 may detect that a user input is received through the user interface 140 in the standby mode S2000. An embodiment in which the aerosol-generating device 100 receives the user input in the standby mode S2000 will be described later in detail with reference to FIG. 9.

The heating mode S3000 is a mode in which the heating element 122 performs a heating operation. For example, the aerosol-generating device 100 may heat an aerosol-generating material using the heating element 122 in the heating mode S3000.

The aerosol-generating device 100 activates the heater connection port 162 of the controller 160 in the heating mode S3000 to supply power to the switch 124, thereby raising the temperature of the heating element 122.

According to an embodiment, the aerosol-generating device 100 may activate the user interface connection port 164 in the heating mode S3000 to receive a user input for stopping heating, a user input for changing the heating intensity, and the like.

According to an embodiment, the aerosol-generating device 100 may measure a temperature change during the heating operation of the heating element 122 by activating the sensor connection port 163 in the heating mode S3000.

The check mode S4000 is a mode for checking the state of the heating element 122. The check mode S4000 may be periodically entered. Hereinafter, an example of the check mode S4000 will be described in detail with reference to FIG. 10.

The aerosol-generating device 100 may activate the sensor connection port 163 of the controller 160 in the check mode S4000. The controller 160 may receive information related to the state of the heating element 122 from the sensor 130 through the sensor connection port 163.

According to one embodiment, the aerosol-generating device 100 may activate the heater connection port 162 in the check mode S4000 to close the switch 124 such that the battery 150 is connected with the heating element 122. The sensor 130 may be connected to the battery 150 through the heating element 122 when the switch 124 is closed. Therefore, the sensor 130 may operate by receiving power when the heater connection port 162 is activated.

According to another embodiment, when the sensor 130 is directly powered from the battery 150, and the information related to the state of the heating element 122 is irrelevant to the operation of the heater 120, the aerosol-generating device 100 may deactivate the heater connection port 162 in the check mode S4000.

The aerosol-generating device 100 may activate or deactivate the user interface connection port 164 in the check mode S4000.

The aerosol-generating device 100 may switch between the standby mode S2000 and the heating mode S3000. According to an embodiment of the present invention, when a user input for heating is received, the aerosol-generating device 100 may switch from the standby mode S2000 to the heating mode S3000. In addition, when smoking is completed, the aerosol-generating device 100 may switch from the heating mode S3000 to the standby mode S2000. The switching between the standby mode S2000 and the heating mode S3000 will be described later in more detail with reference to FIG. 9.

The aerosol-generating device 100 may alternately operate in the standby mode S2000 and the check mode S4000. According to an embodiment of the present invention, the aerosol-generating device 100 may periodically switch between the standby mode S2000 and the check mode S4000. This will be described later in more detail through FIG. 10.

Figure 9:
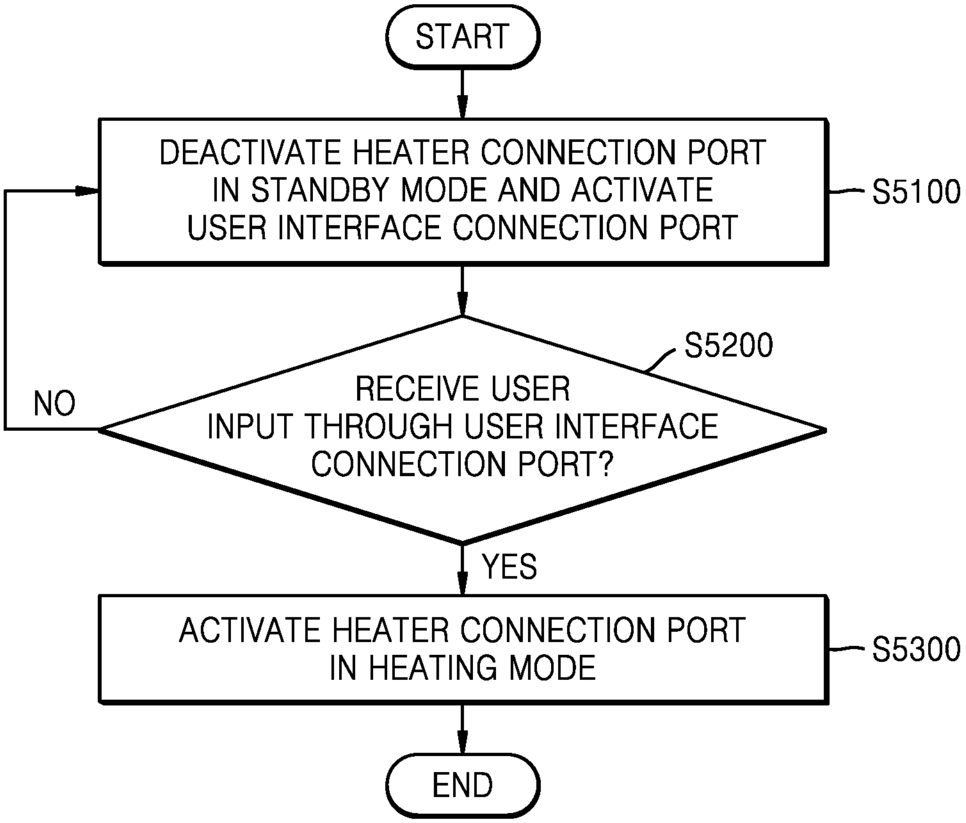
FIG. 9 is a flowchart of an aerosol-generating device operating in a standby mode and a heating mode.

FIG. 9 is a flowchart of an aerosol-generating device operating in a standby mode and a heating mode.

Referring to FIG. 9, in step S5100, the aerosol-generating device 100 may deactivate the heater connection port 162 and activate the user interface connection port 164 in the standby mode. Accordingly, in the standby mode, the aerosol-generating device 100 blocks power consumption through the heater connection port 162, but activates the user interface connection port 164 to receive user input.

Then, in step S5200, the aerosol-generating device 100 may receive a user input through the user interface connection port 164. While the user input is not received, the aerosol-generating device 100 may block the heater connection port 162 while maintaining the standby mode.

When a user input is received through the user interface connection port 164, in step S5300, the aerosol-generating device 100 may enter a heating mode and activate the heater connection port 162. The aerosol-generating device 100 may initiate the operation of the heating element 122 by activating the heater connection port 162 and supplying power to the switch 124 to connect the battery 150 with the heating element 122.

Thereafter, when the aerosol-generating device 100 returns to the standby mode, it may deactivate the heater connection port 162. The aerosol-generating device 100 may deactivate the heater connection port 162 when smoking is completed.

For example, when smoking is completed, the aerosol-generating device 100 may first change the switch 124 to an open state while the heater connection port 162 is activated. Then, the aerosol-generating device 100 may deactivate the heater connection port 162. Thereby, the heating of the heating element 122 may be stopped.

According to another embodiment, the aerosol-generating device 100 may deactivate the heater connection port 162 immediately after smoking is completed.

While performing steps S5100 to S5300, the aerosol-generating device 100 may minimize the standby current in the standby mode by activating the heater connection port 162 only in the heating mode to heat the heating element 122 and by inactivating the heater connection port 162 in the standby mode.

Figure 10:
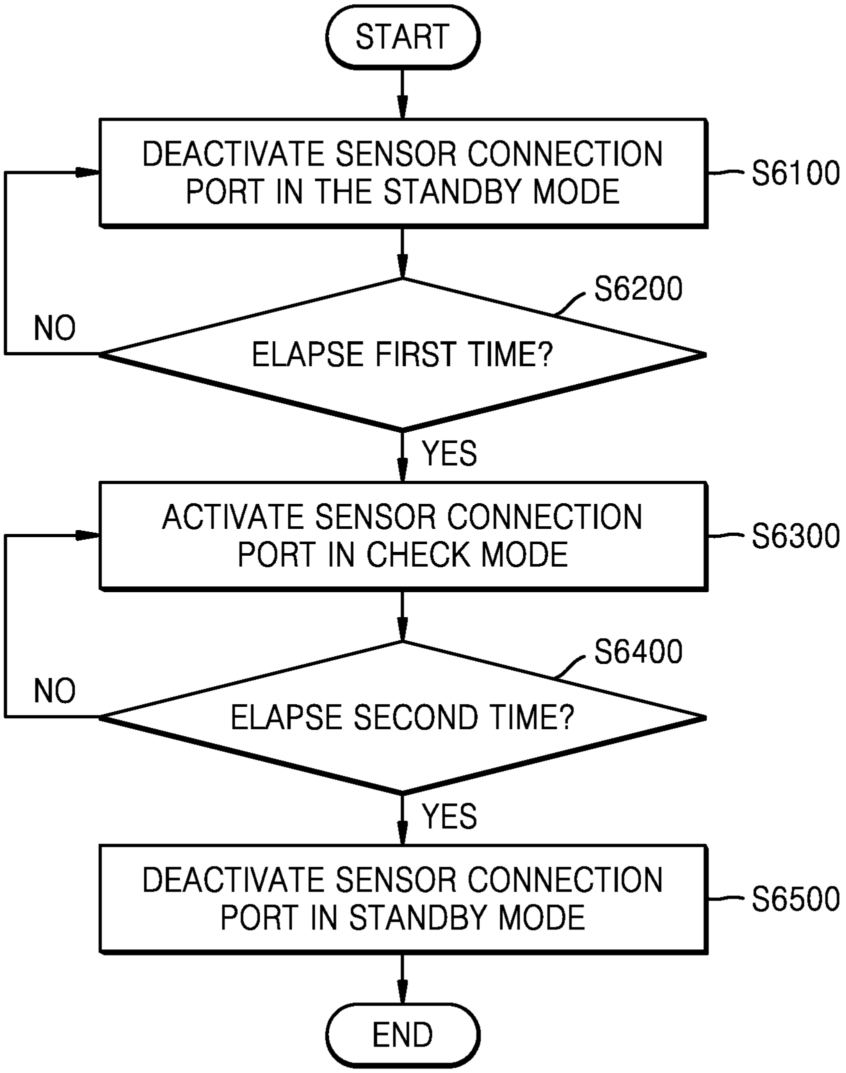
FIG. 10 is a flowchart of an aerosol-generating device operating in a standby mode and a check mode.

FIG. 10 is a flowchart of an aerosol-generating device operating in a standby mode and a check mode.

Referring to FIG. 10, in step S6100, the aerosol-generating device 100 may deactivate the sensor connection port 163 in the standby mode. Thereby, the aerosol-generating device 100 may prevent power consumption through the sensor connection port 163 in the standby mode.

In step S6200, the aerosol-generating device 100 may operate in a standby mode for a first time corresponding to a predetermined time period. The first time may be, for example, 20 seconds.

When the first time has elapsed, in step S6300, the aerosol-generating device 100 may enter the check mode and activate the sensor connection port 163. The aerosol-generating device 100 may check the state of the heating element 122 in the check mode.

In step S6400, the aerosol-generating device 100 may operate the check mode for a second time corresponding to a predetermined time period. The second time may be 250 ms, for example.

The first time and the second time may be an optimal time determined in consideration of power consumed to obtain the information related to the state of the heating element 122, a time required to sense the information related to the state of the heating element 122, and a frequency of checking the state of the heating element 122 state.

In step S6500, the aerosol-generating device 100 may deactivate the sensor connection port 163 when the second time has elapsed. The aerosol-generating device 100 may return to the standby mode after receiving information related to the state of the heating element 122.

While performing steps S6100 to S6500, the aerosol-generating device 100 may minimize the standby current by periodically activating the sensor connection port 163 only when necessary to check the state of the heating element 122 and by deactivating the sensor connection port 163 in the standby mode.

The configuration and features of the present invention have been described above based on the embodiment according to the present invention, but the present invention is not limited thereto. Various changes or modifications within the idea and scope of the present invention are apparent to those skilled in the art to which the present invention pertains, and thus, such changes or modifications are revealed to belong to the appended claims.

What is claimed is:

1. An aerosol-generating device comprising:

a heater including:
- a heating element for heating an aerosol-generating material; and
- a heater switch connected between a battery and the heating element;

a memory configured to store a program; and at least one processor including:
- an internal switch configured to control activation of a first port; and
- the first port electrically connected to the heater, wherein the at least one processor is communicatively coupled to the memory, and configured to control operation of the heating element by controlling activation of the first port, and wherein the at least one processor is configured to execute the program to:

determine whether to deactivate the first port; and based on a determination to deactivate the first port, block an electrical signal from entering and exiting the first port by opening the internal switch and deactivating the first port such that the electrical signal transmitted to the heater switch is removed to reduce a standby current.

2. The aerosol-generating device of claim 1, wherein the at least one processor is further configured to execute the program to:

cut off power supplied to the heater switch by the first port, based on the determination to deactivate the first port, causing the heater switch to stop a heating operation of the heating element.

3. The aerosol-generating device of claim 1, wherein the at least one processor is further configured to execute the program to:

activate the first port to supply power to the heater switch, based on a determination to activate the first port, causing the heater switch to initiate a heating operation of the heating element.

4. The aerosol-generating device of claim 1, further comprising a user interface configured to receive a user input, wherein the controller includes a second port electrically connected to the user interface, and activates the first port based on the user input received through the second port.

5. The aerosol-generating device of claim 4, wherein the controller switches from a first mode in which the first port is deactivated to a second mode to activate the first port when the user input is received through the second port in the first mode.

6. The aerosol-generating device of claim 1, further comprising a sensor configured to detect a state of the heating element, wherein the controller further includes a third port electrically connected to the sensor, and periodically activates and deactivates the third port.

7. The aerosol-generating device of claim 6, wherein the controller activates the third port for a first time period and deactivates the third port for a second time period.

8. The aerosol-generating device of claim 6, wherein the controller activates the first port whenever the third port is activated.

9. The aerosol-generating device of claim 6, wherein the controller outputs an alarm signal when a temperature of the heating element measured through the sensor is greater than or equal to a predetermined temperature.

10. The aerosol-generating device of claim 1, further comprising a sensor configured to detect a state of the heating element, wherein the controller further includes a third port electrically connected to the sensor, and periodically switches between a first mode in which the first port is deactivated and a third mode in which the third port is activated.

11. The aerosol-generating device of claim 1, wherein the at least one processor is further configured to execute the program to:

close the internal switch, based on a determination to activate the first port.

* * * * *